US009294278B2

(12) United States Patent
Yi et al.

(10) Patent No.: US 9,294,278 B2
(45) Date of Patent: Mar. 22, 2016

(54) METHOD FOR WIRELESS LOCAL AREA NETWORK (WLAN)-BASED PEER TO PEER (P2P) COMMUNICATION AND APPARATUS FOR SAME

(71) Applicant: LG ELECTRONICS INC., Seoul (KR)

(72) Inventors: Yunjung Yi, Anyang-si (KR); Jaewon Lim, Anyang-si (KR); Insun Lee, Anyang-si (KR); Bonghoe Kim, Anyang-si (KR); Suhwook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/351,123

(22) PCT Filed: Oct. 10, 2012

(86) PCT No.: PCT/KR2012/008220
§ 371 (c)(1),
(2) Date: Apr. 10, 2014

(87) PCT Pub. No.: WO2013/055106
PCT Pub. Date: Apr. 18, 2013

(65) Prior Publication Data
US 2014/0301552 A1    Oct. 9, 2014

Related U.S. Application Data

(60) Provisional application No. 61/545,205, filed on Oct. 10, 2011.

(51) Int. Cl.
*H04K 1/00* (2006.01)
*H04L 9/30* (2006.01)
(Continued)

(52) U.S. Cl.
CPC   *H04L 9/30* (2013.01); *H04L 63/12* (2013.01); *H04W 12/02* (2013.01); *H04W 12/06* (2013.01);
(Continued)

(58) Field of Classification Search
USPC ......................................................... 380/270
See application file for complete search history.

(56) References Cited

U.S. PATENT DOCUMENTS 8,196,186 B2 *   6/2012   Mityagin et al. ................... 726/4
8,855,134 B2 *  10/2014   Tavildar et al. ............... 370/432
(Continued)

FOREIGN PATENT DOCUMENTS

KR   10-2007-0110822   11/2007
KR   10-2011-0042711    4/2011

OTHER PUBLICATIONS
PCT International Application No. PCT/KR2012/008220, Written Opinion of the International Searching Authority dated Mar. 11, 2013, 14 pages.

*Primary Examiner* — Amare F Tabor
(74) *Attorney, Agent, or Firm* — Lee, Hong, Degerman, Kang & Waimey

(57)  ABSTRACT

The present invention relates to a wireless communication system. More particularly, the present invention relates to a method for performing WLAN-based P2P communication at the state where a P2P apparatus is connected to a cellular network and to a first P2P apparatus for the method. The method comprises: a step of receiving one or more pieces of key information from a cellular base station, each piece of key information including a key value corresponding to service identification information; a step of receiving an encryption data signal from a second P2P apparatus; and a step of performing a process of attempting to decrypt said encrypted data signal using one or more keys corresponding to one or more services in which said first P2P apparatus is interested, from among said one or more pieces of key information.

16 Claims, 10 Drawing Sheets

(51) Int. Cl.
*H04W 84/12* (2009.01)
*H04L 29/06* (2006.01)
*H04W 12/02* (2009.01)
*H04W 12/06* (2009.01)
*H04W 12/04* (2009.01)

(52) U.S. Cl.
CPC ........... *H04W 84/12* (2013.01); *H04L 2209/24* (2013.01); *H04L 2209/80* (2013.01); *H04W 12/04* (2013.01)

(56) References Cited

U.S. PATENT DOCUMENTS

| | | | |
|---|---|---|---|
| 2002/0174335 A1* | 11/2002 | Zhang et al. | 713/168 |
| 2005/0021984 A1* | 1/2005 | Hollander | 713/186 |
| 2008/0009272 A1* | 1/2008 | Toledano | 455/414.1 |
| 2008/0069105 A1* | 3/2008 | Costa et al. | 370/392 |
| 2008/0069348 A1 | 3/2008 | Walker et al. | |
| 2008/0175211 A1* | 7/2008 | Hansen et al. | 370/338 |
| 2010/0299517 A1 | 11/2010 | Jukic et al. | |

* cited by examiner first WFD device (mobile phone)

second WFD device (display device)

METHOD FOR WIRELESS LOCAL AREA NETWORK (WLAN)-BASED PEER TO PEER (P2P) COMMUNICATION AND APPARATUS FOR SAME

CROSS-REFERENCE TO RELATED APPLICATIONS

This application is the National Stage filing under 35 U.S.C. 371 of International Application No. PCT/KR2012/008220, filed on Oct. 10, 2012, which claims the benefit of U.S. Provisional Application Ser. No. 61/545,205, filed on Oct. 10, 2011, the contents of which are all hereby incorporated by reference herein in their entirety.

TECHNICAL FIELD

The present invention relates to a method and apparatus for performing WLAN (Wireless Local Area Network)-based Peer to Peer (P2P) communication in a wireless communication system, and more particularly to a method and apparatus for performing neighbor discovery for WLAN-based P2P communication and a method and apparatus for performing data communication. WLAN indicates a local area network (LAN) based on wireless communication such as a licensed band based on Wireless Fidelity (Wi-Fi), ZigBee, small cell, etc.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

Standards for Wireless Local Area Network (WLAN) technology have been developed as Institute of Electrical and Electronics Engineers (IEEE) 802.11 specifications. IEEE 802.11b may provide a maximum transfer rate of 11 Mbps, and IEEE 802.11a may provide a maximum transfer rate of 54 Mbps. IEEE 802.11g may use Orthogonal Frequency Division Multiplexing (OFDM) at 2.4 GHz, and provide a transfer rate of 54 Mbps. IEEE 802.11n may use Multiple Input Multiple Output (MIMO)-OFDM, and provide a transfer rate of 300 Mbps to four spatial streams. IEEE 802.11a and 802.11b use an unlicensed band at 2.4 GHz or 5 GHz. IEEE 802.11b provides a transmission rate of 11 Mbps and IEEE 802.11a provides a transmission rate of 54 Mbps. IEEE 802.11g applies Orthogonal Frequency-Division Multiplexing (OFDM) at 2.4 GHz to provide a transmission rate of 54 Mbps. IEEE 802.11n may use Multiple Input Multiple Output (MIMO)-OFDM, and provide a transfer rate of 300 Mbps. IEEE 802.11n may support a channel bandwidth up to 40 MHz to provide a transfer rate of 600 Mbps. IEEE 802.11p is a standard for supporting Wireless Access in Vehicular Environment (WAVE). For example, IEEE 802.11p provides improvement matters needed to support Intelligent Transportation Systems (ITS). IEEE 802.11ai is a standard for supporting fast initial link setup of an IEEE 802.11 station (STA).

In recent times, Wireless Fidelity (Wi-Fi) alliance has announced Wi-Fi based P2P technology (e.g., Wi-Fi Direct (WFD)) and has authenticated the Wi-Fi based P2P technology. The Wi-Fi P2P technology is applied to portable devices (e.g., TVs, laptops, printers, cameras, etc.) and mobile phones, such that the Wi-Fi P2P technology can provide Machine-to-Machine (M2M) content and services through direct UE-to-UE communication without using an additional device such as an Access Point (AP) or a router. The Wi-Fi P2P technology provides a high transfer rate, so that it is expected that the Wi-Fi P2P technology can be replaced with Bluetooth technology within some regions.

DISCLOSURE

Technical Problem

An object of the present invention is to provide a method and apparatus for efficiently performing WLAN-based P2P communication. Another object of the present invention is to provide a method and apparatus for efficiently performing processes of authentication/encryption for WLAN-based P2P communication.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing WLAN (Wireless Local Area Network)-based P2P (Peer to Peer) communication in a first P2P device connected to a cellular network including: receiving at least one key information from a cellular base station (BS), wherein each key information includes service ID information and a key value corresponding to the service ID information; receiving an encrypted data signal from a second P2P device; and attempting to decrypt the encrypted data signal using at least one key corresponding to at least one service interested by the first P2P device from among the at least key information.

In another aspect of the present invention, a first peer to peer (P2P) device connected to a cellular network, and configured to perform WLAN (Wireless Local Area Network)-based P2P (Peer to Peer) communication includes: a radio frequency (RF) unit; and a processor, wherein the processor is configured to receive at least one key information from a cellular base station (BS), wherein each key information includes service ID information and a key value corresponding to the service ID information, receive an encrypted data signal from a second P2P device, and attempt to decrypt the encrypted data signal using at least one key corresponding to at least one service interested by the first P2P device from among the at least key information.

The encrypted data signal may be received on the condition that information of the second P2P device or information of a group including the second P2P device is not present.

Several key values contained in the at least one key information may be identically configured either in all P2P devices contained in a cell in which the cellular base station (BS) provides a service, or in P2P devices having an interest in the same P2P service.

A header of the encrypted data signal may include at least one of key ID information and service ID information.

If the header of the encrypted data signal does not have information regarding a key or service interested by the first P2P, the encrypted data signal is discarded; and if the header of the encrypted data signal has information regarding a key or service interested by the first P2P, a decryption process of the encrypted data signal is performed.

The encrypted data signal may be discarded from a physical (PHY) layer, and the decryption process of the encrypted data signal may be performed in a Medium Access Control (MAC) layer.

The at least one key information may be updated when a predetermined timer expires.

The method may further include: transmitting information configured to request updating of the at least one key information to the cellular base station (BS).

Advantageous Effects

As is apparent from the above description, the embodiments of the present invention can efficiently perform WLAN-based P2P communication in a wireless communication system. In more detail, the embodiments can efficiently perform authentication/encryption processes for WLAN-based P2P communication.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), OFDM (Orthogonal Frequency Division Multiplexing), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as IEEE 802.16 (WiMAX), IEEE 802-20, and E-UTRA (Evolved UTRA). OFDM may be implemented through wireless (or radio) technology such as IEEE 802.11.

For clarity, the following description focuses on IEEE 802.11 (Wi-Fi). However, technical features of the present invention are not limited thereto. For example, exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

It should be noted that specific terms disclosed in the present invention are proposed for convenience of description and better understanding of the present invention, and the use of these specific terms may be changed to other formats within the technical scope or spirit of the present invention. In some instances, well-known structures and devices are omitted in order to avoid obscuring the concepts of the present invention and the important functions of the structures and devices are shown in block diagram form. The same reference numbers will be used throughout the drawings to refer to the same or like parts. The order of operations to be disclosed in the embodiments of the present invention may be changed. Some components or characteristics of any embodiment may also be included in other embodiments, or may be replaced with those of the other embodiments as necessary.

Figure 1A:
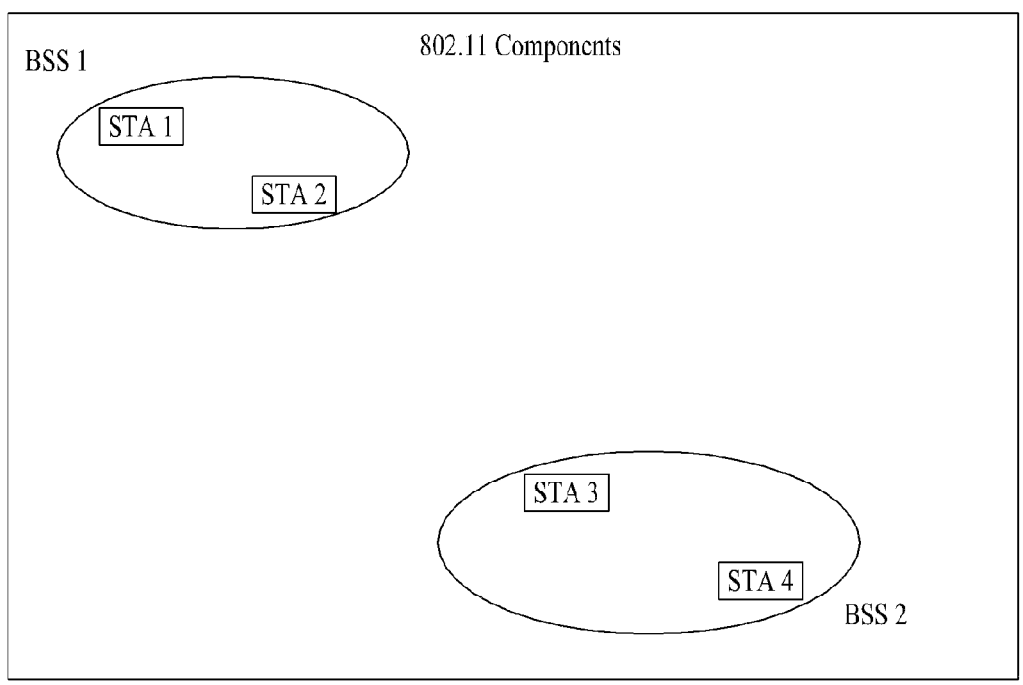
FIG. 1a exemplarily shows a WLAN (e.g., IEEE 802.11) system applicable to the embodiments of the present invention.

FIG. 1a exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1a, two BSSs (BSS1 and BSS2) are shown and two STAs are included in each of the BSSs (i.e. STA1 and STA2 are included in BSS1 and STA3 and STA4 are included in BSS2). In this case, STA may operate according to MAC (Medium Access Control)/PHY (Physical) rules. STA may include an Access Point (AP) STA (hereinafter referred to as an AP) and a non-AP STA. AP may provide network (e.g., WLAN) connection to a non-AP STA through a radio interface. AP may be implemented as a fixed type or a mobile type, and may include mobile wireless devices (e.g., a laptop computer, a smartphone, etc.) for providing a hot spot. The AP may correspond to a base station (BS), a Node-B, an evolved Node-B (eNB), a base transceiver system (BTS), a femto BS, etc. The non-AP STA may correspond to a handheld device, for example, a laptop computer, a PDA, a wireless modem, a smartphone, etc. In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS).

An ellipse indicating the BSS in FIG. 1a may be understood as a coverage area in which STAs included in the corresponding BSS maintain communication. This area may be referred to as a Basic Service Area (BSA). In the IEEE 802.11 LAN, the most basic type of BSS is an Independent BSS (IBSS). For example, the IBSS may have a minimum form consisting of only two STAs. The BSS (BSS1 or BSS2) of FIG. 1a, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS.

Figure 1B:
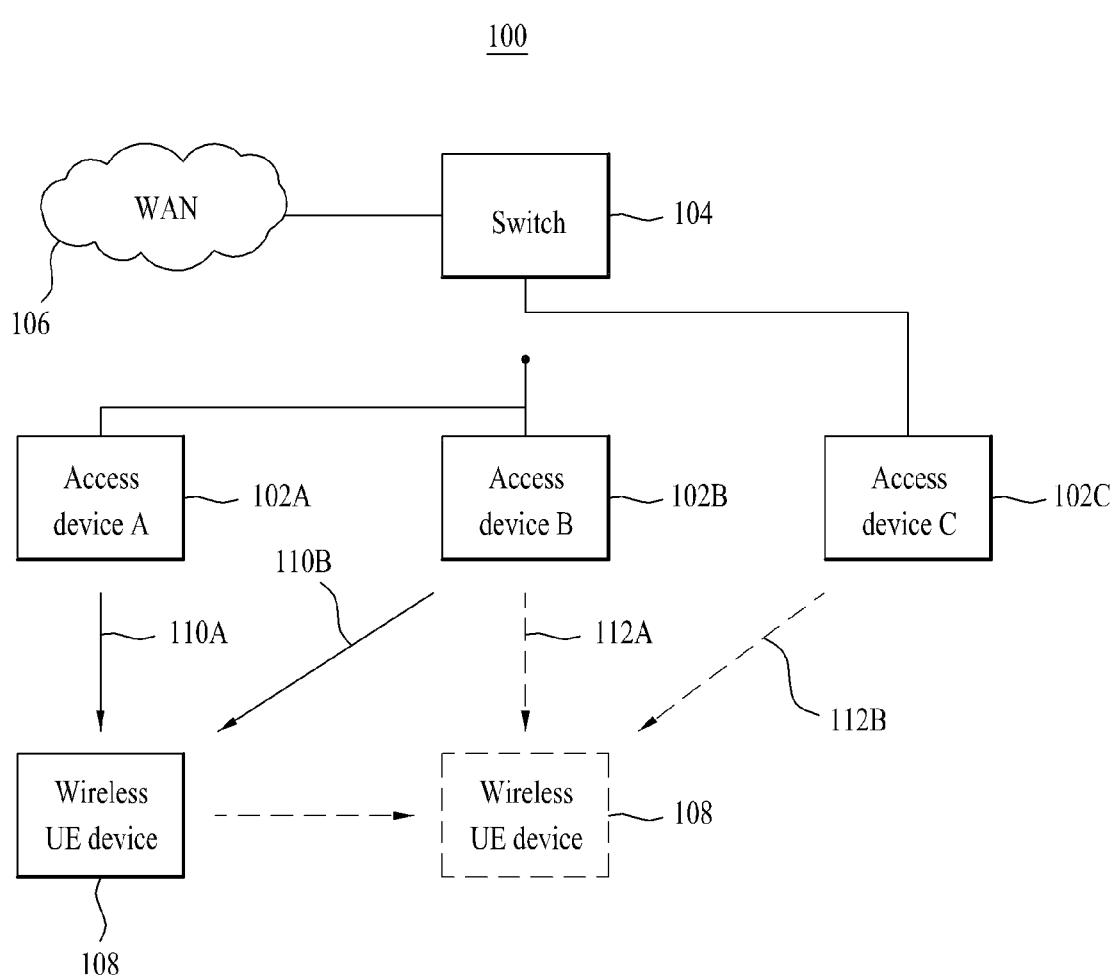
FIG. 1b is a block diagram illustrating exemplary operations of a communication system including access devices and wireless user devices.

FIG. 1b is a block diagram illustrating a communication system 100 including access devices (e.g., AP STAs) (102A, 102B, 102C) and wireless UE devices (e.g., non-AP STAs).

Referring to FIG. 1b, the access devices (102A to 102C) are connected to a switch 104 for providing connection to a Wide Area Network (WAN) 106 such as the Internet. The access devices (102A to 102C) may provide wireless connection to wireless communication devices contained in a coverage area (not shown) of the access devices through a time division multiplexing (TDM) network. Therefore, the access devices (102A to 102C) may commonly provide the whole WLAN coverage region of the system 100. For example, a wireless device 108 may be present in a coverage region of the access devices (102A, 102B), as represented by a box denoted by a solid line. Therefore, the wireless device 108 may receive beacons from respective access devices (102A, 102B) as denoted by solid-lined arrow marks (110A, 110B). If the wireless device 108 roams from a solid-lined box to a dotted-lined box, the wireless device 108 enters a coverage region of the access device 102C, and moves out of a coverage region of the access device 102A. Accordingly, the wireless device 108 may receive beacons from the access devices (102B, 102C) as denoted by dotted-lined arrow marks (112A, 112B).

When the wireless device 108 roams in the whole WLAN coverage region provided from the system 100, the wireless device 108 may determine which access device provides the best connection to the current wireless device 108. For example, the wireless device 108 may repeatedly scan beacons of neighbor access devices, and may measure signal strength (e.g., power) associated with each beacon. Accordingly, the wireless device 109 may be connected to an access device for providing optimum network connection on the basis of maximum beacon signal strength. The wireless device 108 may use other references associated with optimum connection. For example, the optimum connection may be associated with many more preferable services (e.g., content, data rate, and the like).

Figure 2:
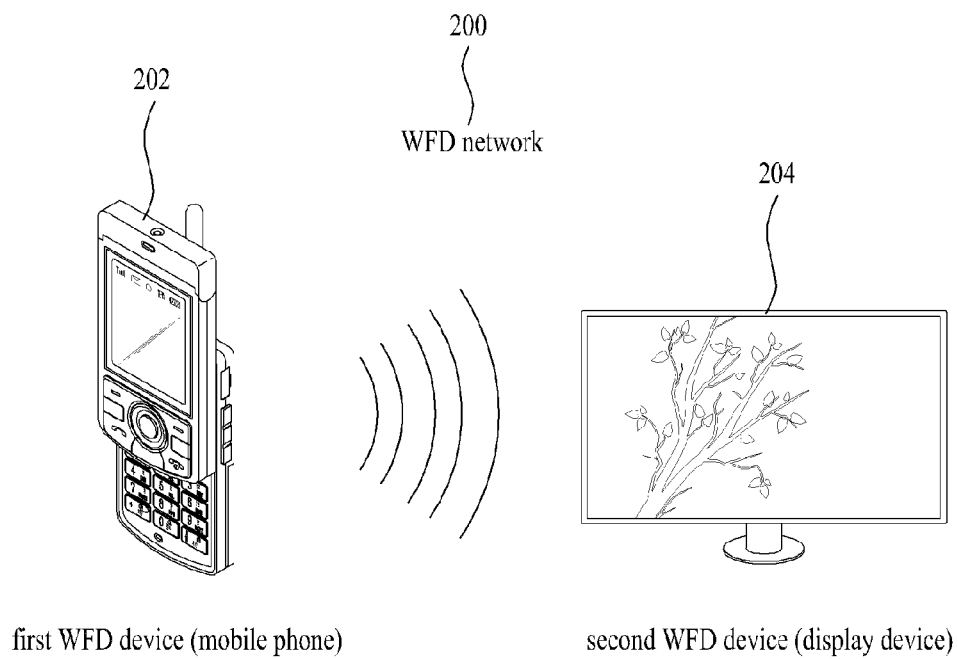
FIG. 2 is a conceptual diagram illustrating a WLAN-based P2P (e.g., Wi-Fi Direct (WFD)) network.

FIG. 2 is a conceptual diagram illustrating a WLAN-based P2P (e.g., Wi-Fi Direct (WFD)) network. The WLAN-based P2P network can enable the Wi-Fi devices not to participate in a home network, an office network, a hot-spot network, and performs Device to Device (D2D) (or Peer to Peer: P2P) communication. Hereinafter, WLAN-based P2P communication is referred to as WLAN P2P communication (simply, P2P communication) or WLAN D2D communication (simply, D2D communication). In addition, the WLAN P2P execution device will hereinafter be referred to as a WLAN P2P device (simply a P2P device).

Referring to FIG. 2, the WLAN P2P network 200 may include at least one P2P device configured to include a first P2P device 202 and a second P2P device 204. The P2P device may include WLAN supporting devices, for example, a display device, a printer, a digital camera, a projector, a smartphone, etc. In addition, the P2P device may include a non-AP STA and an AP STA. In this example, the first P2P device 202 is a smartphone, and a second P2P device 204 is a display device. Here, P2P communication is mounted to portable devices and mobile phones, such that the P2P communication can provide Machine-to-Machine (M2M) content and services through direct UE-to-UE communication without using an additional device such as an Access Point (AP) or a router. The P2P devices of the P2P network may be directly interconnected. In more detail, P2P communication may indicate that a signal transmission path between two P2P devices is directly configured in the corresponding P2P devices without passing through a third device (e.g., AP) or a legacy network (e.g., a network coupled to WLAN through an AP). In this case, a signal transmission path directly configured between two P2P devices may be limited to a data transmission path. For example, P2P communication may indicate that a plurality of non-STAs transmits data (e.g., voice, image, text information, etc.) without passing through the AP. A signal transmission path for control information (e.g., resource allocation information for P2P configuration, wireless device ID information, etc.) may be directly configured between P2P devices (e.g., non-AP STA to non-AP STA, non-AP STA to AP), may be configured between two P2P devices (e.g., non-AP to non-AP STA) via the AP, or may be configured between the AP and the corresponding P2P device (e.g., AP to non-AP STA #1, AP to non-AP STA #2).

Presently, P2P may be mainly used for semi-static communication such as remote printing, photo sharing, etc. However, due to generalization of WLAN devices and location based services, P2P availability is gradually increased. For example, wireless devices registered with chat services (e.g., Social Network Service (SNS)) can recognize radio devices located in a neighboring region on the basis of the location based service, and can transmit and receive information in the neighboring region on the basis of the location based service. It is expected that the P2P device will be actively used in location-based advertisement provision, location-based news broadcasting, and game interaction between wireless devices. For convenience of description, such P2P application will hereinafter be referred to as new P2P application.

Figure 3:
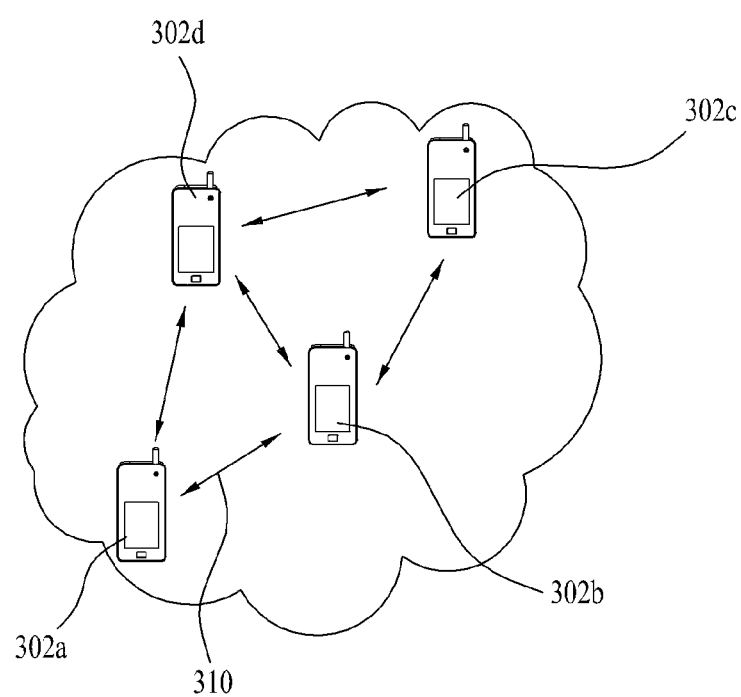
FIG. 3 is a conceptual diagram illustrating an exemplary WLAN-based P2P aspect.

FIG. 3 shows the WFD network aspects for use in the case in which new P2P application (e.g., chat services (social chatting), location-based service provision, game interaction, etc.) is applied. Referring to FIG. 3, a plurality of P2P devices (302a to 302d) performs P2P communication 310 in the P2P network, P2P device(s) constructing the P2P network may be changed at any time due to movement of the P2P device(s), and a new P2P network may be dynamically generated or deleted within a short time. As described above, characteristics of the new P2P application part indicate that P2P communication can be dynamically achieved and terminated within a short time among a plurality of P2P devices in a dense network environment.

The Wi-Fi P2P network construction process may be broadly classified into two processes. A first process is a neighbor discovery (ND) procedure in step S302a. A second process is a P2P link configuration and communication process in step S304. Through the neighbor discovery process, the P2P device (e.g., 202 of FIG. 2) searches for another neighbor P2P device (e.g., 204 of FIG. 2) contained within (radio) coverage thereof, and may obtain information of association (e.g., pre-association) with the corresponding P2P device. In this case, the pre-association may indicate a second layer pre-association in a radio protocol. For example, information needed for the pre-association may include ID information of the neighbor P2P device.

Figure 4:
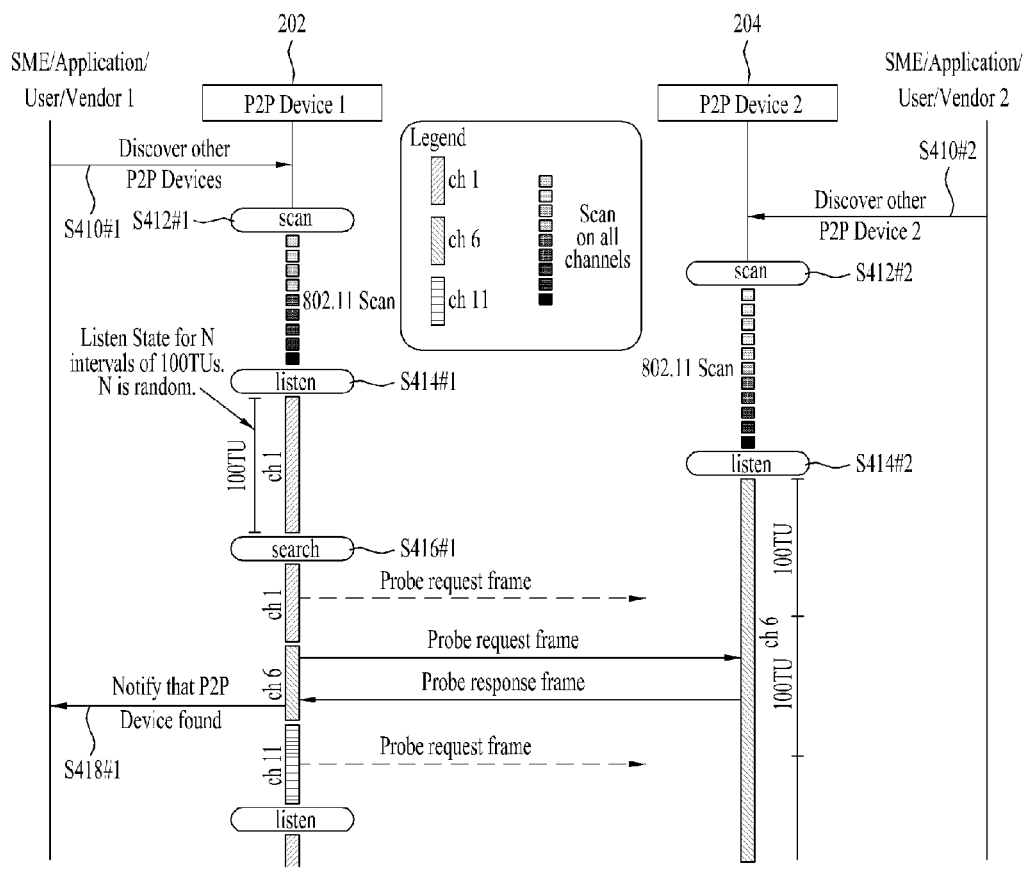
FIG. 4 is a conceptual diagram illustrating a neighbor discovery process.

The neighbor discovery process is shown in FIG. 4. FIG. 4 exemplarily shows the operations between one P2P device 202 and the other P2P device 204 shown in FIG. 2.

Referring to FIG. 4, the neighbor discovery process may be initiated by indication of station management entity (SME)/application/user/vendor in step S410. The scanning step S412 may include the operation for scanning all available RF channels according to 802.11. Through the above-mentioned operation, the P2P device can confirm the best operation channel. The search steps (S414~S416) may include a listening mode S414 and a search mode S416. The P2P device may alternately repeat the listening mode S414 and the search mode S416. The P2P devices (202, 204) may perform active search using a probe request frame in the search mode S416. For rapid search, the searching range may be limited to social channels denoted by Channels #1, #6, #11 (2412, 2437, 2462 MHz). In addition, the P2P devices (202, 204) may select only one channel from among three social channels in the listening mode S414, and maintain a reception status. In this case, if the other P2P device (e.g., 202) receives the probe request frame in the search mode, the P2P device (e.g., 204) generates a probe response frame in response to the received probe request frame. A time of the listening mode S414 may be given at random (e.g., 100, 200, 300 time units (TUs)). The P2P device continuously repeats the search mode and the reception mode so that it reaches a common channel. After the P2P device discovers another P2P device, the P2P device may discover/exchange a device type, a name of a manufacturing company, or a name of a familiar device using the probe request frame and the probe response frame such that the P2P device can be selectively coupled to the corresponding P2P device. If the P2P device discovers the peripheral P2P device and obtains necessary information through the neighbor discovery process, the P2P device (e.g., 202) may inform SME/application/UE/vendor of the P2P device discovery in step S418.

The 802.11 WLAN authentication/encryption process hereinafter be described in detail. As can be seen from FIGS. 1 to 4, the 802.11 WLAN protocol includes two communication structures. In the first communication structure (shown in FIG. 1), STA is associated with AP, and communicates with the AP. For this purpose, 802.11 WLAN may support an authentication algorithm and an encryption algorithm. The authentication process is a process for deciding whether to permit/sever network access by identifying user information. If network access is permitted through the authentication process, Tx/Rx data communicated through a radio interface is encrypted. The scope or spirit of the present invention is not limited thereto, the authentication process is performed between an authentication server (AS) and a station (STA). The AS generates a key and transmits the key to the AP. The AS is a 802.1x component for performing an authentication service for the UE so as to implement network access, and may be implemented through a remote authentication dial in user service (RADIUS) server, an authentication, authorization, and accounting (AAA) server, etc. In case of an independent BSS (IBSS) mode, the AP may transmit a shared key instead of the AP to a counterpart peer. The key may be used to encrypt/decrypt all data transmitted through the radio interface. In the second communication structure/mode (e.g., FIGS. 2 to 4), STAs may communicate with each other according to the P2P scheme. In this case, authentication and encryption may be performed in a similar way to the first communication structure/mode.

Figure 5:
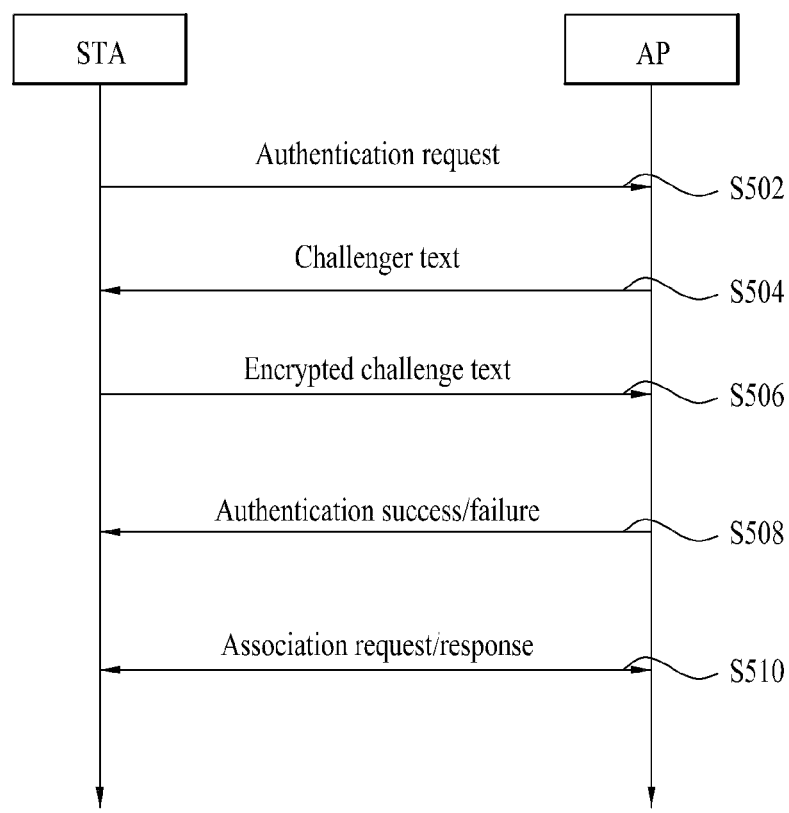
FIGS. 5 and 6 are conceptual diagrams illustrating WLAN authentication/encryption processes.

FIG. 5 is a conceptual diagram illustrating an authentication/encryption process when WLAN supports Wired Equivalent Privacy (WEP). WEP may perform authentication/encryption using a shared key.

Referring to FIG. 5, the shared key authentication process is largely classified into four steps (S502 to S508).

First Step: STA transmits an authentication request message to the AP in step S502. The authentication request message includes an STA identity.

Second Step: AP may transmit a challenge test to the STA in step S504.

Third Step: STA may encrypt the challenge text of the second step using a 64-bit key or 128-bit key configured in the STA itself, and may transmit the encrypted challenge text to the AP in step S506.

Fourth step: AP may decrypt the encrypted challenge text using the WEP key configured in the AP in response to the corresponding STA key. The AP compares the decrypted text with original text. If the decrypted text is identical to the original text, this means that AP and STA share the same WEP key, such that the AP may inform the STA of the successful authentication in step S508. Thereafter, the STA and the AP may perform the association process in step S510, and Tx/Rx data communicated through the radio interface is encrypted using the shared key. Meanwhile, if two texts are different from each other, this means that the AP and the STA do not share the same WEP key, such that the AP may inform the STA of authentication failure in step S508. In this case, it is impossible for the STA to be associated with the AP.

Figure 6:
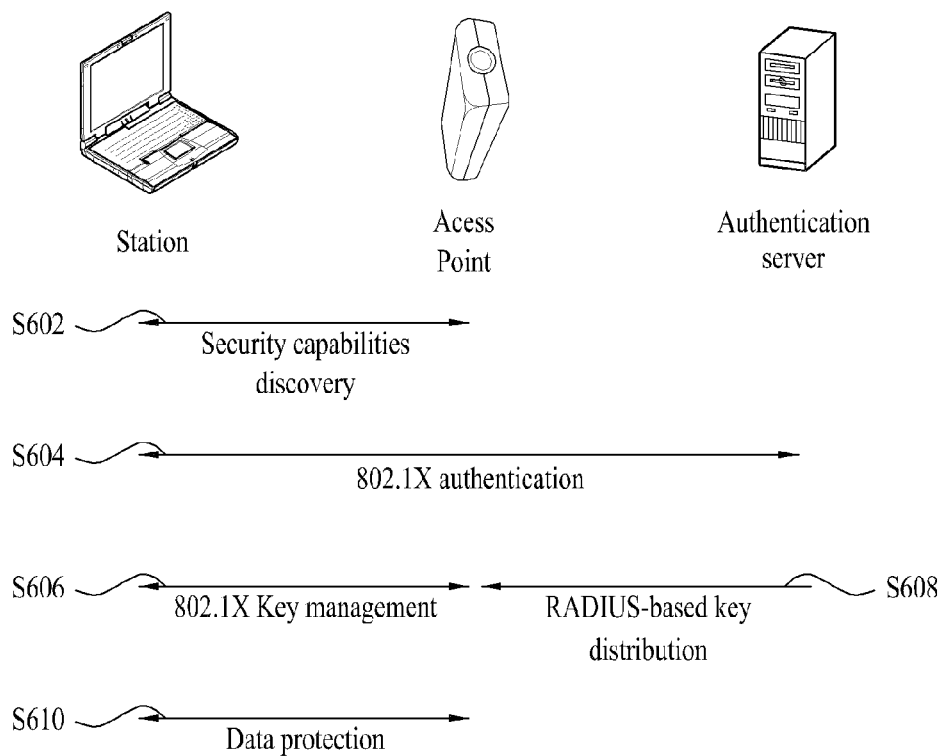

FIG. 6 is a conceptual diagram illustrating an authentication/encryption process when WLAN supports Robust Security Network (RSN). RSN may support TKIP (Temporal Key Integrity Protocol) and CCMO (Counter Mode with cipher block chaining message authentication code Protocol).

Referring to FIG. 6, there may be four phases for key distribution in steps S602 to S608.

Security Capabilities Discovery (S602): AP may advertise network security capabilities to the STA. A communication target having possibility of communication execution may be decided through security capability discovery.

802.1X authentication (S604): The network admission policy decisions are centralized by the AS. In step S604, STA and AS are mutually authenticated. Through such authentication, a master key is generated. The master key indicates affirmation access decision. In addition, a Pairwise Master Key (PMK) is generated as an access authentication token. PMK indicates grant of 802.11 medium.

RADIUS-based key distribution (S606): AS does not copy PMK into the AP of the STA, and moves the PMK to the STA AP.

802.1X management (S608): PMK is bound with STA and AP. It is confirmed that the AP and the STA own or possess the PMK. In step S608, fresh pairwise transient key (PTK) is generated, PTK use is synchronized, and GTK (Group Transient Key) distribution is performed. PTK is a collection of KCK (Key Confirmation Key), KEK (Key Encryption Key), and TK (Temporal Key). KCK is used to bind PMK with AP and STA, and is used to testify PMK possession. KEK is used to perform GTK distribution. TK is used for data encryption. This 802.1A management process S608 is performed by 4-way handshake using PMK.

If key distribution is completed by the above step, Tx data communicated between the AP and the STA through a radio interface is encrypted through an encryption key (e.g., TK).

According to the legacy 802.11 WLAN security mechanism shown in FIGS. 5 and 6, many more packets are exchanged between the STA and the AP or between the ASs so as to implement authentication and key distribution, resulting in occurrence of high overload. This overhead may not cause the legacy static network structure (e.g., FIG. 1). However, in case of the P2P network (shown in FIGS. 2 to 4), UEs may continuously move to other places and session between the UEs is maintained only for a very short time, such that the legacy high overhead may be undesirable. Specifically, in case of new P2P application (See FIG. 3) such as social chatting, location-based advertisement, location-based news broadcasting, P2P communication may be dynamically or quickly achieved between a plurality of P2P devices under a dense network environment. As a result, many more session or many more users (or UEs) may be present within a radio range of the STA, and overhead problem caused by authentication/encryption may be considered more important.

Therefore, for efficient execution of P2P communication, it may be preferable that overhead needed to configure data session including the authentication and association process be extremely minimized. In addition, an additional explicit association process may not occur in P2P communication, and may provide packet-based authentication and encryption.

Embodiment

Key Distribution Using Cellular Network

A method for efficiently performing a key management/distribution process to implement authentication/encryption will be explained. In more detail, the present invention may propose a method for performing key management/distribution for P2P communication using a cellular network. As described above, according to the legacy schemes (shown in FIGS. 5 and 6), whenever the P2P device participates in the network or generates the network, the P2P device may request the authentication process, or may perform the multi-stage key distribution process. The reason why the P2P device performs the above operations is that the P2P device cannot recognize the authentication state of the corresponding P2P device when the P2P device initially participates in the network or initially generates the network. However, as described above, if P2P communication keys are distributed to a plurality of P2P devices using the cellular network (e.g., (cellular) base station or eNB), the corresponding P2P devices can be authenticated within the cellular network (in so far as the corresponding P2P devices are associated with the cellular network). Therefore, if P2P communication (e.g., social chatting) is performed among P2P devices having keys distributed from the cellular network, the additional authentication/key distribution process for P2P communication may be omitted. In summary, the P2P device having the P2P communication key received from the cellular network (e.g., BS or eNB) has already been authenticated by the cellular network. Thereafter, although the P2P devices newly participate in the P2P network and uses the corresponding P2P key, the authentication process may be omitted such that P2P communication can be more efficiently performed.

Two methods for distributing the WLAN P2P key through the cellular network will hereinafter be described in detail. Assuming that the P2P device includes both a cellular communication module and a WLAN communication module (e.g., Wi-Fi, Zigbee, and a communication module for a licensed band based on a small cell), the term 'P2P device' is used interchangeably with STA/UE for convenience of description. In addition, it is assumed that the P2P device is association with (connected to) the cellular network unless specially mentioned otherwise.

Method 1: P2P Group Key Distribution

Method 1 shows a method for distributing a group key for P2P. In this case, the group key may be allocated per service category for P2P. In accordance with Method 1, the BS (cellular BS) of the cellular network transmits the list of {Service category, key} to STA/UE in the cell. Therefore, the {Service category, key} list is shared by one or more STAs/UEs in the cell. In this case, the above-mentioned key is used for P2P service discovery and communication. In this case, the above-mentioned {service category, key} list may be STA/UE-specifically, STA/UE group-specifically, and cell-specifically transmitted (on the basis of services interested by the STA/UE). In order to allow the BS to transmit the above {service category, key} list according to any one of the STA/UE-specific method and the STA/UE group-specific method, STAs/UEs in the cell may transmit information (e.g., the list of services) regarding one or more interested services to the cellular BS.

In accordance with the above-mentioned example, key allocation is allocated per service category, such that P2P communication is performed on the basis of the service categories. That is, P2P communication is performed between multiple STAs/UEs configured to use the same service category (i.e., the same key), and STAs/UEs configured to perform P2P do not need to know about each other. Therefore, it is possible for one STA/UE to perform P2P communication with one or more other STAs/UEs in close proximity on the condition that the STA/UE does not recognize either information of the one or more proximity STAs/UEs or information of a group including other STAs/UEs. As described above, by guaranteeing anonymous of the entity configured to perform P2P communication, it is possible to perform the secure P2P service group even without a procedure of actually forming a P2P group. That is, the BS (or eNB) transmits the above {service category, key} list to STA/UE in the cell, whereby the STA/UE can obtain a desired key for P2P communication, and can also perform operations of when the STA/UE belongs to a P2P group even without a procedure of participating to the P2P group.

Figure 7:
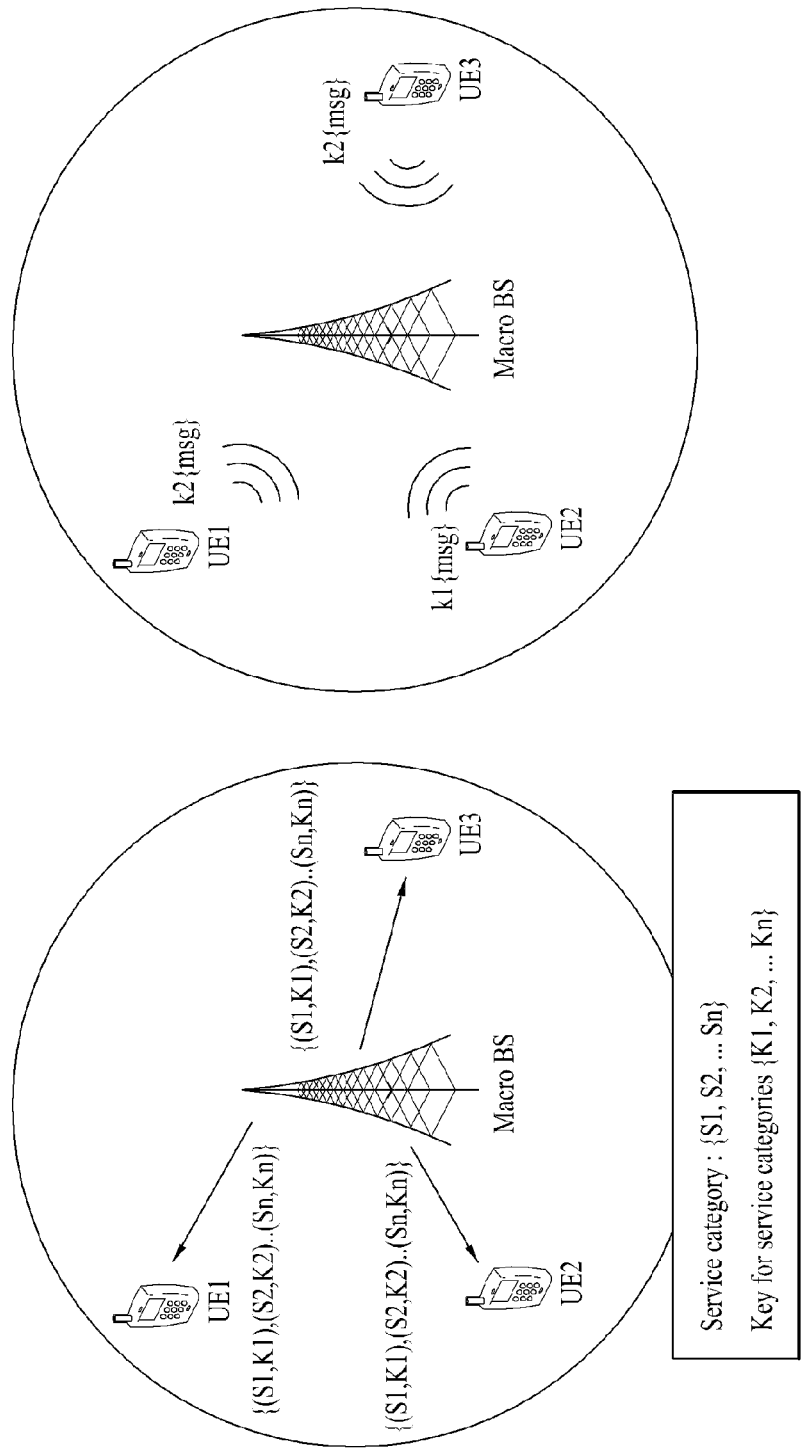
FIGS. 7 and 8 are conceptual diagrams illustrating authentication/encryption processes according to the present invention.

FIG. 7 is a conceptual diagram illustrating an example of the group key distribution/management process. Referring to FIG. 7, the group key management/distribution process and associated P2P communication can be carried out as follows.

First Step: If STA/UE is interested in a social P2P services, the STA/UE may request a list of P2P group keys (e.g., social P2P keys) to the BS (or eNB). A service category, IDs (S1, S2, ..., Sn) (where n is an integer of 1 or higher) of the corresponding categories, and a detailed description of the service categories may be represented, not limited thereto, by the following Table 1.

TABLE 1

| ID | Service Category | Description |
|---|---|---|
| 0 | Social P2P chatting | STA/UE talk to each other (unicast or multicast) (similar to Kakao talk) |
| 1 | Socail Advertisement | STA/UE broadcasts advertisement information such as coupons, weekly ad, special deals, etc |
| 2 | Social map | STA/UE exchange data for location-dependent information such as local restaurant review, theater movie list, etc |
| 3 | On-line gaming | STA/UE participate on-line multi-party gaming without accessing a centralized game server |
| 4-255 | Reserved | |

Second Step: Upon receiving a request of the list of P2P group keys, the BS may transmit the above-mentioned {service category identification information (e.g., ID), key} list (i.e., (S1, K1), (S2, K2), ..., (Sn, Kn)) to the STA/UE in association with the service categories supported by the cell.

Third Step: STA/UE may perform encryption/decryption of messages belonging to a specific service category using the group key. In more detail, if the STA/UE transmits messages for the service category (Si), the STA/UE may encrypt the corresponding message using a specific key corresponding to the service category (Si). In response to the above-mentioned operation, if the STA/UE may receive a message for the service category (Si) or searches for the corresponding service, the STA/UE may attempt to decrypt a reception (Rx) message using a specific key (Ki) corresponding to the service category (Si). That is, STA/UE may attempt to decrypt the Rx message using only a specific key corresponding to the service category of interest. In this case, if STA/UE desires to receive a message belonging to several service categories, the STA/UE may attempt to decrypt the Rx message using a plurality of keys. In addition, in order to facilitate the service searching/message detection using the group key, information (or a service category, a service category ID) regarding the group key may be contained in the message header. Through the above-mentioned processing, the counterpart STA/UE may easily filter data of an undesired group (or service category). In more detail, data of the undesired group (or service category) may be filtered in a filtering in a physical (PHY) layer, and unfiltered data in the filtering may be decrypted in a MAC (Medium Access Control) layer. In accordance with this example, in case of using P2P communication in which the key allocated to the service group is shared, one STA/UE may transmit/receive data even though it does not recognize information (e.g., STA/UE ID) regarding a target STA/UE or information regarding a group including the target STA/UE.

The group key proposed by the above-mentioned example may be updated according to a predetermined condition. For example, the BS may provide the group key to the STA/UE, and may perform setting of the "KEY EXPIRATION" timer. The "KEY EXPIRATION" timer may expire after lapse of a specific time T upon completion of group key transmission to the STA/UE. If the "KEY EXPIRATION" timer has expired, the BS may regenerate the group key, and transmit the (service category ID, updated key) list to the STA/UE. In addition, the STA/UE may request group key updating (e.g., social P2P key) to the BS (or eNB), and the BS (or eNB) may update group key in consideration of the requested group key information. The above-mentioned operation for enabling STA/UE to request group-key updating may be carried out after completion of timer expiration. In this case, the timer may run upon receiving the group key and expire after lapse of T1 time.

Method 2: Distribution of Individual Keys for P2P

The group key mechanism shown in Method 1 has the following features: (1) provides a group key so that STAs/UEs authenticated in the cellular network can encrypt/decrypt messages of all services or groups supported by the cell, (2) data of undesired group (or service category) is filtered in a filtering in a Physical (PHY) layer, and unfiltered data in the filtering is decrypted in a Medium Access Control (MAC) layer, and (3) P2P communication is performed on the basis of the group key corresponding to the service category, whereby data transmission/reception (Tx/Rx) can be carried out without information regarding the counterpart STA/UE.

However, since keys are shared by all STAs/UEs in the cell according to Method 1, it is impossible to provide privacy on P2P communication. Therefore, the present invention proposes a method for providing secure P2P connection using the cellular network. It is assumed that STA/UE in the cell has already recognized the presence and ID (e.g., STA/UE ID) of another STA/UE (in the same cell) configured to perform P2P communication through the legacy neighbor discovery (e.g., FIG. 4).

Figure 8:
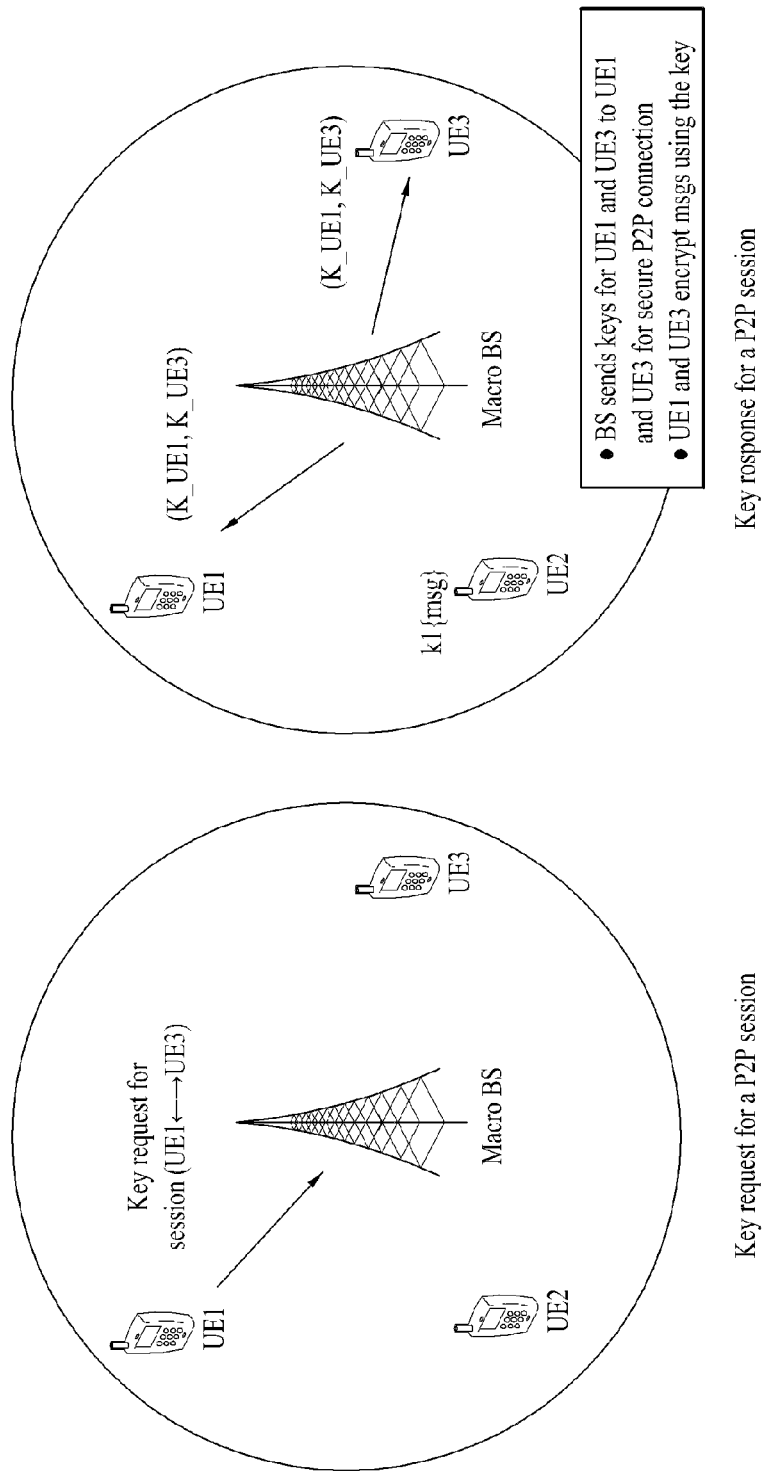

FIG. 8 is a conceptual diagram illustrating a process for distributing/managing individual keys according to the present invention. In this case, each key may indicate key(s) shared by P2P peers (i.e., two STAs/UEs), key(s) shared by a limited number of STAs/UEs, or key(s) shared by STAs/UEs in a limited group. Referring to FIG. 8, individual key management/distribution processes and associated P2P communication can be carried out as follows.

First Step: If STA/UE (e.g., UE1) desires P2P connection with a specific STA/UE (e.g., UE3), UE1 may request a key for P2P session with UE3 to the BS (or eNB). For this purpose, a message for requesting the key may include ID information (e.g., STA/UE ID) regarding the counterpart STA/UE, and information (e.g., ID information shown in Table 1) regarding a desired service (e.g., social chatting). In a case that P2P connection with unspecified STA/UE is necessary according to services (e.g., an online battle game), ID information (e.g., STA/UE ID) of the counterpart STA/UE may be omitted, or may be configured as a specific value.

Second Step: Upon receiving a request for a P2P key from UE1, the BS (or eNB) provides a respective public key of each peer to UE1 and UE3. Referring to the attached drawings, a private key (K_UE1) of UE1 is provided to/open to UE3, and a private key (K_UE3) of UE3 is provided to/open to UE1. UE3 may be a STA/UE requested by UE1, and may be a STA/UE arbitrarily selected by the BS according to service types.

Third Step: STA/UE may encrypt data using the public key, and the counterpart STA/UE may decrypt Rx data using its own private key. Referring to the attached drawings, UE1 may encrypt Tx data using the public key (K_UE3), and UE3 may decrypt Rx data using the private key (K_UE3). In contrast, UE3 may encrypt Tx data using the public key (K_UE1), and UE1 may decrypt Rx data using the private key (K_UE1).

Providing the public key only when STA/UE requests the public key may be more efficient in a case when the number of P2P sessions is less than the number of STA/UE peers.

Figure 9:
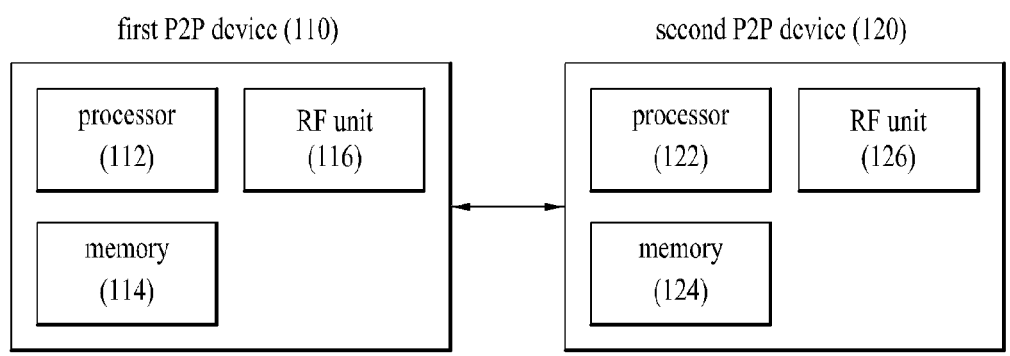
FIG. 9 is a block diagram illustrating a WLAN-based P2P device applicable to the present invention.

FIG. 9 is a block diagram illustrating a WLAN P2P device applicable to the present invention.

Referring to FIG. 9, the WLAN P2P network includes a first P2P device 110 and a second P2P device 120. The first P2P device 110 includes a processor 112, a memory 114, and a radio frequency (RF) unit 116. The processor 112 may be constructed to implement the procedures and/or methods disclosed in the embodiments of the present invention. The memory 114 may be connected to the processor 112, and store various information related to operations of the processor 112. The RF unit 116 is connected to the processor 112, and transmits and/or receives RF signals. The RF unit 116 includes both a cellular communication module and a WLAN communication module (e.g., Wi-Fi, Zigbee, and a communication module for a licensed band based on a small cell). The second P2P device 120 includes a processor 122, a memory 124, and an RF unit 126. The processor 122 may be constructed to implement the procedures and/or methods disclosed in the embodiments of the present invention. The memory 124 may be connected to the processor 122, and store various information related to operations of the processor 122. The RF unit 126 is connected to the processor 122, and transmits and/or receives RF signals. The RF unit 126 includes both a cellular communication module and a WLAN communication module (e.g., Wi-Fi, Zigbee, and a communication module for a licensed band based on a small cell). The first P2P device 110 and/or the second P2P device 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to claims other than the specific claims to constitute the embodiment or add new claims by means of amendment after the application is filed.

The above-described embodiments may be implemented by various means, for example, by hardware, firmware, software, or a combination thereof. In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Exemplary embodiments of the present invention can be applied to a P2P communication device. In more detail, the embodiments of the present invention can be applied to a WLAN-based P2P communication device.

The invention claimed is:

1. A method for performing WLAN (Wireless Local Area Network)—based P2P (Peer to Peer) communication in a first P2P device connected to a cellular network, comprising:
   receiving at least one key information from a cellular base station (BS),
   wherein each key information of the at least one key information includes service ID information and a key value corresponding to the service ID information, and
   wherein the first P2P device is authenticated within the cellular network;
   receiving an encrypted data signal from a second P2P device using the P2P communication,
   wherein a header of the encrypted data signal includes a first service ID information; and
   when the first service ID information corresponds to a second service ID information from the received at least one key information, decrypting the encrypted data signal using a key value corresponding to the second service ID information, the second service ID information identifying a service of interest to the first P2P device.

2. The method according to claim 1, wherein the encrypted data signal is received on the condition that information of the second P2P device or information of a group including the second P2P device is not present.

3. The method according to claim 1, wherein several key values contained in the at least one key information are identically configured either in all P2P devices contained in a cell in which the cellular base station (BS) provides a service, or in P2P devices having an interest in the same P2P service.

4. The method according to claim 1, further comprising:
   discarding the encrypted data signal when the first service ID information does not correspond to the first service ID information.

5. The method according to claim 4, wherein the discarded encrypted data is discarded from a physical (PHY) layer.

6. The method according to claim 1, wherein the encrypted data signal is decrypted in a Medium Access Control (MAC) layer.

7. The method according to claim 1, wherein the at least one key information is updated when a predetermined timer expires.

8. The method according to claim 1, further comprising:
   transmitting information configured to request updating of the at least one key information to the cellular base station (BS).

9. A first peer to peer (P2P) device connected to a cellular network authenticated in the cellular network, and configured to perform WLAN (Wireless Local Area Network)—based P2P (Peer to Peer) communication, comprising:
   a radio frequency (RF) unit; and
   a processor configured to:
   receive at least one key information from a cellular base station (BS),
   wherein each key information of the at least one key information includes service ID information and a key value corresponding to the service ID information, and
   wherein the first P2P device is authenticated within the cellular network;
   receive an encrypted data signal from a second P2P device using the P2P communication,
   wherein a header of the encrypted data signal includes a first service ID information; and
   when the first service ID information corresponds to a second service ID information from the received at least one key information, decrypt the encrypted data signal using a key value corresponding to the second service ID information, the second service ID information identifying a service of interest to the first P2P device.

10. The first P2P device according to claim 9, wherein the encrypted data signal is received on the condition that information of the second P2P device or information of a group including the second P2P device is not present.

11. The first P2P device according to claim 9, wherein several key values contained in the at least one key information are identically configured either in all P2P devices contained in a cell in which the cellular base station (BS) provides a service, or in P2P devices having an interest in the same P2P service.

12. The first P2P device according to claim 9, wherein the processor is further configured to discard the encrypted data signal when the first service ID information does not correspond to the first service ID information.

13. The first P2P device according to claim 12, wherein the discarded encrypted data is discarded from a physical (PHY) layer.

14. The first P2P device according to claim 9, wherein the encrypted data signal is decrypted in a Medium Access Control (MAC) layer.

15. The first P2P device according to claim 9, wherein the at least one key information is updated when a predetermined timer expires.

16. The first P2P device according to claim 9, wherein the processor is configured to transmit information requesting updating of the at least one key information to the cellular base station (BS).

* * * * *